No. 716,708. Patented Dec. 23, 1902.
A. M. HART.
NUT LOCK.
(Application filed July 10, 1902.)
(No Model.)

Witnesses:
A. H. Butler,
C. E. Potter,

Inventor:
A. M. Hart,
By
N. C. Everett & Co.
Attorneys

THE NORRIS PETERS CO., PHOTO-LITHO., WASHINGTON, D. C.

UNITED STATES PATENT OFFICE.

ANTHONY M. HART, OF ALLEGHENY, PENNSYLVANIA.

NUT-LOCK.

SPECIFICATION forming part of Letters Patent No. 716,708, dated December 23, 1902.

Application filed July 10, 1902. Serial No. 114,979. (No model.)

*To all whom it may concern:*

Be it known that I, ANTHONY M. HART, a citizen of the United States of America, residing at Allegheny, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and has for its object to provide a nut-lock which will prevent the nut from turning and from becoming lost from the bolt.

A further object of my invention is to provide a nut-lock that will be extremely simple in construction, strong, durable, comparatively inexpensive to manufacture, and highly efficient in its operation.

With the above and other objects in view the invention consists in the novel construction, combination, and arrangement of parts to be hereinafter more fully described and specifically pointed out in the claims.

In describing the invention in detail reference is had to the accompanying drawings, forming a part of this specification, and wherein like numerals of reference indicate like parts throughout the several views, in which—

Figure 1:
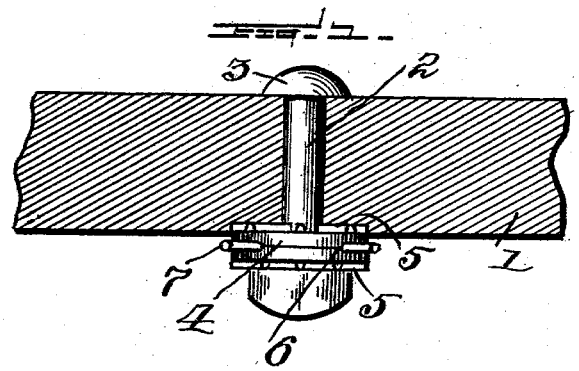
Figures 2, 3:
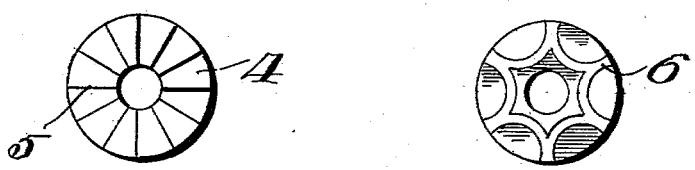
Figure 4:
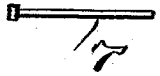

Figure 1 is a top plan view of my improved nut-lock, showing the same secured to a suitable piece of material. Fig. 2 is a side elevation of one of the washers. Fig. 3 is a view of the opposite side of the washer. Fig. 4 is a view of the locking-pin.

In the drawings the reference-numeral 1 indicates a suitable piece of material through which I have secured an ordinary bolt 2, carrying a head 3, and upon the screw-threaded end thereof I have secured a washer 4, said washer being shown in Figs. 2 and 3 of the drawings. This washer has projections 5 secured thereupon, and on the opposite face of the washer are formed the semicircular grooves 6, these grooves forming a locking means for the washer. It will be noted in Fig. 1 of the drawings that I employ two of these washers and place the same together so the grooves 6 will coincide, and the projections upon said washers will bear into the material through which the bolt is secured and upon the rear face of the nut, as shown in Fig. 1 of the drawings. Through the grooves 6, which when the washers are placed together form apertures, I secure a locking-pin 7, which is made of some flexible material, so the same will follow the course of the grooves and present the appearance as shown in Fig. 1 of the drawings.

The operation of my improved device is as follows: It being desired to place the nut upon the bolt the washer 4 is first placed upon the same, with the side carrying the projections next to the material 1, and then a similar washer is placed thereupon, with its grooved side 6 facing the first washer. The nut is then secured upon the bolt and turned until the grooves of the washers coincide with each other, when the locking-pin 7 is driven through said grooves, thus locking the same in place. It will be readily seen that upon securing the locking-pin within said grooves the outer ends of the pin can be bent over, thus preventing the same from becoming disengaged from said groove.

While I have shown the most practical embodiment of my invention, yet it will be obvious that various changes may be made in the details of construction without departing from the general spirit of my invention.

Having fully described my invention, what I claim as new, and desire to secure by Letters Patent, is—

1. In a nut-lock, the combination with a bolt, a nut, washers provided on their contacting faces with a plurality of semicircular grooves, the meeting ends of which form substantially radial openings, a locking means engaging in said grooves and having its ends projecting from said radial openings, and a series of teeth formed on the opposite sides of said washers, substantially as described.

2. In a nut-lock, the combination with a bolt, a nut, washers provided on one face with semicircular grooves, on the opposite sides of said washers, said washers being adapted to fit together with their semicircular grooves registering, forming locking-apertures, said apertures extending radially of said washers, and a locking-pin adapted to fit into said apertures of the washers, substantially as described.

In testimony whereof I affix my signature in the presence of two witnesses.

ANTHONY M. HART.

Witnesses:
JOHN NOLAND,
P. A. DUFT.